Sept. 25, 1928.

W. RAEBURN 1,685,378

LUBRICATING DEVICE

Filed Aug. 8, 1921

Inventor
William Raeburn
Williams, Bradbury,
Lee & McCabe Attys

Patented Sept. 25, 1928.

1,685,378

UNITED STATES PATENT OFFICE.

WILLIAM RAEBURN, OF WATERBURY, CONNECTICUT, ASSIGNOR TO THE BASSICK MANUFACTURING COMPANY, OF CHICAGO, ILLINOIS, A CORPORATION OF DELAWARE.

LUBRICATING DEVICE.

Application filed August 8, 1921. Serial No. 490,464.

My invention relates to improvements in lubricating devices, and is particularly concerned with improvements in lubricating devices forming a part of that type of lubricating system which comprises a plurality of fittings adapted to be respectively secured to the bearings to be lubricated, and a compressor, the discharge conduit of which is provided with coupling means for successively connecting the compressor with the fittings in sealed relation, so that lubricant can be supplied to the bearings under high pressure.

Many automobiles are now equipped with systems of the character described above, and the fittings secured to the bearings thereof are exposed to dust, dirt and rain. It is one object of my invention to provide means for excluding dust, dirt, and rain from such fittings.

Another object of my invention is to provide means of the character described, comprising a dust cap having means for co-acting with certain parts of the fitting to secure the dust cap thereto in such manner as to exclude the dust, dirt, etc. from that portion of the fitting with which the coupling on the discharge conduit of the compressor makes contact.

A still further object is to provide a cap of the character described, which can be easily attached to and detached from the fitting and which, when once attached, will not be caused to rattle by the vibrations set up in the portion of the machine to which the fitting is attached.

An additional object of my invention is to provide means of the character described which is simple in construction and economical to manufacture.

Figure 1:
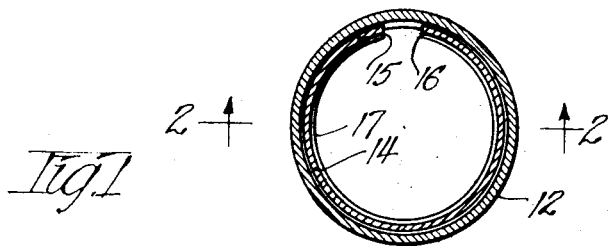
Figure 2:
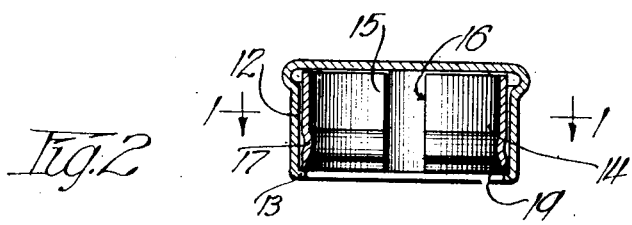
Figure 3:
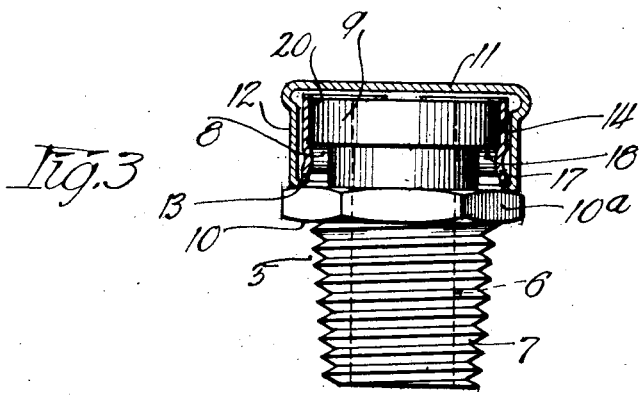
Figure 4:
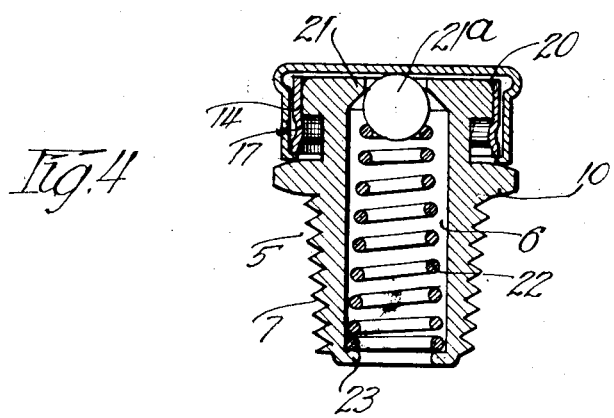

Other objects will appear as this description progresses, reference being had to the accompanying drawings in which Figure 1 is a central transverse section through the dust cap forming a part of my invention, this section being taken on line 1—1 of Figure 2, Figure 2 is a central vertical section taken on the line 2—2 of Figure 1, Figure 3 is a view similar to Figure 2 except that it shows my improved dust cap attached to a fitting forming part of my invention, the fitting being shown in side elevation, and Figure 4 is a central vertical section through a slightly modified form of fitting, which is equipped with my improved dust cap.

Throughout the several views similar reference characters will be used for referring to similar parts.

Referring for the present to Figures 1 to 3 inclusive, my invention comprises a lubricant receptacle 5, which is in the form of a tubular member having a bore 6 of uniform diameter extending longitudinally thereof, one end 7 of the tubular member being screw threaded to provide means for securing it to a bearing to be lubricated. An annular groove 8 formed adjacent the opposite end of the lubricant receptacle forms a flange or head 9, which is adapted to co-act with portions of the coupling member on the lubricant compressor for establishing a sealed connection between the lubricant compressor and the lubricant receptacle 5. Intermediate the annular groove 8 and the threaded end portion 7 of the tubular member is a flange 10 of slightly greater diameter than the remaining portion, which is provided with facets 10$^a$ for receiving the jaws of a wrench or other device used for threading the end 7 of the tubular member into a bearing.

The dust cap forming a part of my invention comprises an inverted cup shaped member having a disk shaped top 11, and the downwardly extending flange 12, the edge of which is turned in slightly as shown at 13, to define a shallow annular groove of substantially the axial length of the cup itself for receiving and retaining the thin tubular longitudinally split spring ring 14 within the cup shaped member. The ends 15 and 16 of the ring 14 are spaced apart as shown in Figure 2. An annular rib 17 extends inwardly from the split ring and is adapted to engage beneath the side 18 of the flange 9, as shown in Figure 3, to yieldingly secure the dust cap to the lubricant receptacle. The edge 19 of ring 14 is bevelled or cammed as shown in Figures 2 and 3, and the corner 20 of the fitting is rounded, as shown in Figure 3, so that when the cap is brought into registry with the upper end of the fitting and pushed downwardly, the bevelled edge 19 of the ring and the rounded corner 20 of the fitting will co-act to expand the split ring so that it will pass around the upper end of the fitting. The cap is moved downwardly until the annular rib 17 snaps into the groove 8. In this position, the lower edge of the flange 12 is held in tight contact with the flange 10 so as to exclude dust from the groove 8 and the outer end of the fitting.

In the embodiment of my invention illustrated in Figure 4, the outer end of the bore 6 of the tubular member, or lubricant receptacle, is flanged inwardly to provide a seat 21 for the ball closure 21ª. This closure is yieldingly held against the seat 21 by a compression spring 22, the inner end of which is confined by the inturned flange 23 at the inner end of the fitting. When the dust cap is removed from the fitting, the ball projects slightly beyond the end of the fitting, but when the cap is secured to the fitting, the closure 21ª is displaced inwardly slightly so that the tension of the spring 22 tends to push the dust cap outwardly away from the fitting. The tension of the spring 22 is insufficient, however, to overcome the tension of the split ring 14 and dislodge the cap from the fitting, but it is sufficient to hold the cap so that the vibrations set up in the part of the machine to which it is attached will not cause it to rattle.

While I have described the details of construction of the preferred embodiment of my invention, it is to be clearly understood that my invention is not limited to these details, but is capable of other adaptations and modifications within the scope of the appended claims.

Having thus described my invention, what I claim is:—

1. The combination with a lubricant receptacle comprising a tubular member having a flange at one end thereof, of a cap for said tubular member comprising a cup-shaped member having a skirt portion adapted to surround the end of said tubular member and terminating in an inwardly projecting flange, and a split tubular ring loosely held in said skirt portion by its own resiliency, said ring having a projection extending inwardly from the inner face thereof and positioned to engage said flange when said cup is forced over the flanged end of said tubular member.

2. A cap for a lubricant receptacle forming part of a high pressure lubricating system comprising a cup-shaped member having an annular skirt portion terminating in an inwardly projecting flange and a split tubular ring loosely held in said skirt by its own resiliency.

3. The combination of a lubricant receptacle adapted to form part of a high pressure lubricating system, said receptacle having a cylindrical end, an annular groove back of said end and a portion back of said groove of larger diameter than said end, a dust cap comprising a cup body telescoping over said end and including a cylindrical part encircling said end and said groove and terminating in an inwardly projecting flange, and a split tubular ring loosely carried in said cylindrical portion and having an inwardly extending projection adapted to resiliently engage the rear edge of said cylindrical end to retain said cap in place and press said flange against said portion of larger diameter.

In witness whereof, I hereunto subscribe my name this 19th day of July, 1921.

WILLIAM RAEBURN.